US007248959B2

(12) United States Patent
Enomoto et al.

(10) Patent No.: US 7,248,959 B2
(45) Date of Patent: Jul. 24, 2007

(54) ELECTRONIC CONTROL APPARATUS WHICH RESPONDS TO SHUT-DOWN COMMAND BY EXECUTING SPECIFIC PROCESSING PRIOR TO CEASING OPERATION

(75) Inventors: Hiroyuki Enomoto, Kariya (JP); Kokichi Shimizu, Kariya (JP); Nobuyuki Kondo, Okazaki (JP)

(73) Assignee: DENSO Corporation, Kariya, Aichi-pref. (JP)

( * ) Notice: Subject to any disclaimer, the term of this patent is extended or adjusted under 35 U.S.C. 154(b) by 0 days.

(21) Appl. No.: 11/453,937

(22) Filed: Jun. 16, 2006

(65) Prior Publication Data

US 2006/0287805 A1 Dec. 21, 2006

(30) Foreign Application Priority Data

Jun. 17, 2005 (JP) ............................ 2005-177941

(51) Int. Cl.
*G06F 13/12* (2006.01)
*F02N 11/08* (2006.01)
*F02D 41/06* (2006.01)

(52) U.S. Cl. ...................... 701/102; 701/114; 701/115; 123/179.24; 123/179.3; 73/118.1; 73/118.2

(58) Field of Classification Search ................ 701/102, 701/106, 112, 113, 114, 115; 73/118.1, 118.2; 123/179.1, 179.24, 179.3
See application file for complete search history.

(56) References Cited

U.S. PATENT DOCUMENTS

| | | | | |
|---|---|---|---|---|
| 6,094,975 | A * | 8/2000 | Hasegawa et al. | 73/118.1 |
| 6,708,089 | B2 * | 3/2004 | Hashimoto et al. | 701/1 |
| 6,732,044 | B2 * | 5/2004 | Hashimoto et al. | 701/114 |
| 7,155,326 | B2 * | 12/2006 | Nagata | 701/36 |

FOREIGN PATENT DOCUMENTS

| | | |
|---|---|---|
| JP | 11-099890 | 4/1999 |
| JP | 2000-065691 | 3/2000 |
| JP | 2003-312386 | 11/2003 |
| JP | 2003-312387 | 11/2003 |

* cited by examiner

*Primary Examiner*—Willis R. Wolfe
*Assistant Examiner*—Johnny H. Hoang
(74) *Attorney, Agent, or Firm*—Nixon & Vanderhye P.C.

(57) ABSTRACT

An electronic control apparatus includes a control circuit and has a power supply holding function whereby when a power switch-off command is received by the apparatus, the supplying of power to the control circuit is continued until it has completed specific processing, during a power supply holding interval. The duration of each such interval is measured and stored in non-volatile memory, and subsequently used for detecting any power supply holding function abnormality, and for ensuring that the specific processing is actually performed, and distinguishing between an abnormality causing premature switch-off and an abnormality causing failure to terminate the supplying of power.

15 Claims, 5 Drawing Sheets

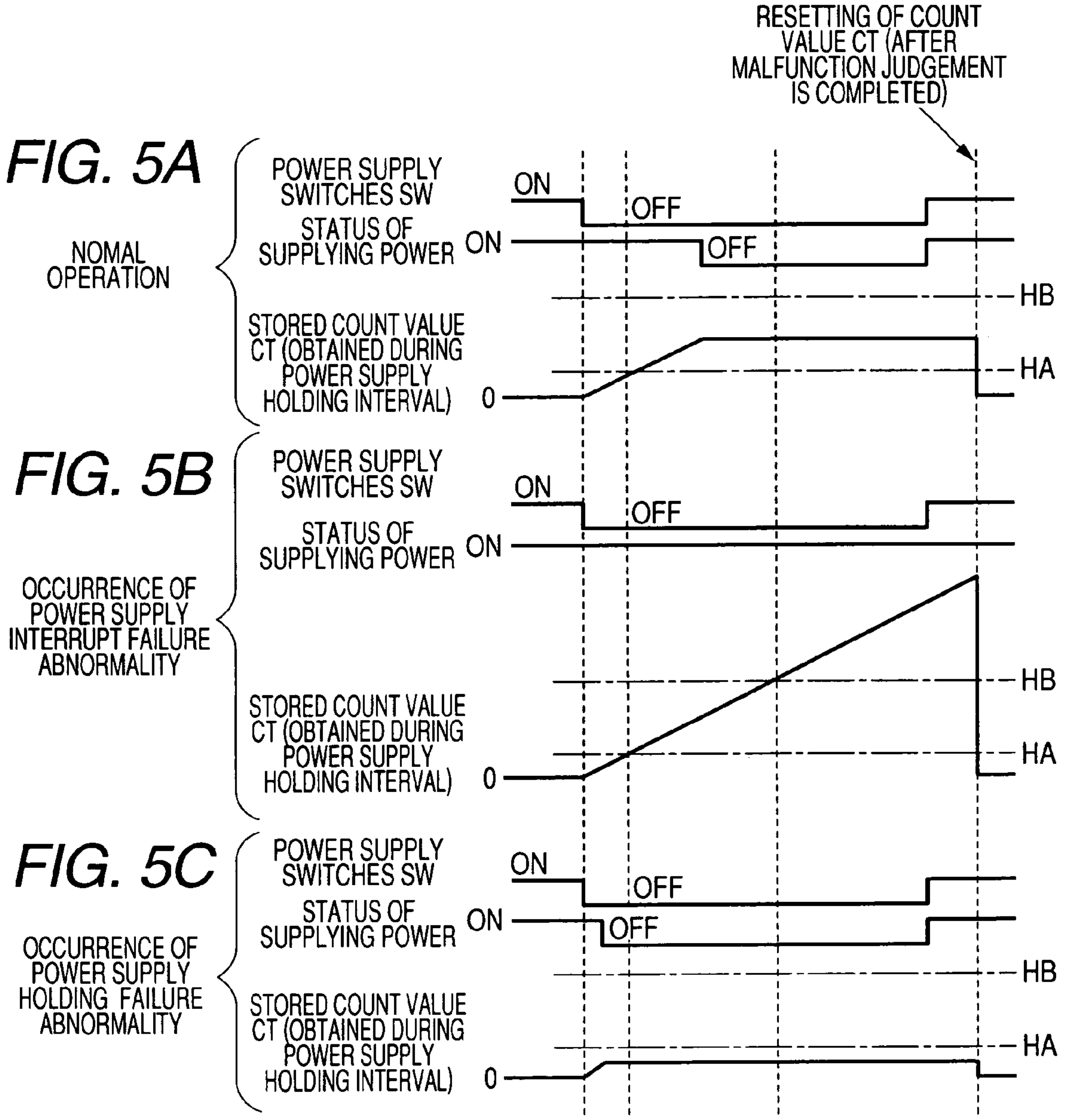
RESETTING OF COUNT VALUE CT (AFTER MALFUNCTION JUDGEMENT IS COMPLETED)
FIG. 5A
NOMAL OPERATION
POWER SUPPLY SWITCHES SW
ON
OFF
STATUS OF SUPPLYING POWER
ON
OFF
HB
STORED COUNT VALUE CT (OBTAINED DURING POWER SUPPLY HOLDING INTERVAL)
HA
0
FIG. 5B
OCCURRENCE OF POWER SUPPLY INTERRUPT FAILURE ABNORMALITY
POWER SUPPLY SWITCHES SW
ON
OFF
STATUS OF SUPPLYING POWER
ON
HB
STORED COUNT VALUE CT (OBTAINED DURING POWER SUPPLY HOLDING INTERVAL)
HA
0
FIG. 5C
OCCURRENCE OF POWER SUPPLY HOLDING FAILURE ABNORMALITY
POWER SUPPLY SWITCHES SW
ON
OFF
STATUS OF SUPPLYING POWER
ON
OFF
HB
STORED COUNT VALUE CT (OBTAINED DURING POWER SUPPLY HOLDING INTERVAL)
HA
0

ELECTRONIC CONTROL APPARATUS WHICH RESPONDS TO SHUT-DOWN COMMAND BY EXECUTING SPECIFIC PROCESSING PRIOR TO CEASING OPERATION

CROSS-REFERENCE TO RELATED APPLICATIONS

This application is based on and incorporates herein by reference Japanese Patent Application No. 2005-177941 filed on Jun. 17, 2005.

BACKGROUND OF THE INVENTION

1. Field of Application

The present invention relates to an electronic control apparatus incorporating a control circuit and having a power supply holding function whereby, when an externally produced command designates that the operating power of the control circuit is to be switched off, the supplying of that power is continued during an interval in which the control circuit completes the execution of specific processing.

2. Description of Related Art

In recent years, types of electronic control apparatus have been proposed which have a power supply holding function as described above and also a power supply shut-off function, for example as described in Japanese patent publication No. 2003-312386 which is concerned with an ECU (electronic control unit) of a motor vehicle. With that ECU, when the vehicle driver turns the ignition switch to the on position, so that an ignition switch signal (which serves as a power supply on/off changeover command signal) goes to a high level (corresponding to a power-on command status of the command signal), a power supply control circuit supplies a fixed supply voltage (derived from the vehicle battery voltage) to a CPU (central processing unit), and operation of the CPU then begins. When the ignition switch is subsequently set to the off position, so that the ignition switch signal goes to a low level (corresponding to a power-off command status of the command signal), the CPU executes shut-off processing whereby system operation information is written into an EEPROM (electrically erasable programmable memory). When that shut-off processing is completed, the CPU 11 outputs a power-down permission signal to the power supply control circuit, i.e., constituting a power supply halt command.

At that point, the power supply control circuit halts the supplying of operating power to the CPU, with the operation of the CPU then being halted.

In order to detect abnormality of the operation of the power supply holding function with that apparatus, after the shut-off processing has been executed to completion and before outputting the power-down permission signal, the CPU sets a specific flag that is held in the EEPROM, i.e., a “normal termination indication flag”, to the 1 state. Each time the ignition switch is switched on, the normal termination indication flag is examined and if it is not found to be set in the 1 state (thereby indicating that processing by the CPU was not terminated normally at the preceding occasion when the ignition switch was switched off), then it is judged that an abnormality of the power supply holding function has occurred.

With such an electronic control apparatus, it is possible to detect an abnormality whereby (after the ignition switch is switched off) the power supply voltage does not continue to be supplied to the CPU until completion of the shut-off processing. However it is not possible to detect an abnormality whereby the power supply voltage to the CPU is not cut off even after the shut-off processing has been completed, i.e., a power supply interruption failure type of abnormality occurs. When such an abnormality occurs, then since the predetermined processing (shut-off processing) will be executed to completion by the CPU after the ignition switch has been switched off, the CPU will set the normal termination indication flag to the 1 state.

In the case of a motor vehicle, the vehicle battery is used as the power source for deriving the power supply voltage of the ECU. If a power supply interruption failure abnormality is not detected, then a significant level of current may continue to be supplied to the ECU from the vehicle battery after the ignition switch has been switched off and the ignition key removed. In particular, the aforementioned specific processing may become repetitively executed after the ignition switch has been switched off and the ignition key removed. As a result of this, and due to other control operations that may be performed in such a condition (for controlling actuators etc., normally performed only while the vehicle is being driven) the vehicle battery may become completely discharged.

SUMMARY OF THE INVENTION

It is an objective of the present invention to overcome the above problem that arises with an electronic control apparatus having a power supply holding function, by enabling not only a power supply holding failure abnormality but also a power supply interruption failure abnormality of the power supply holding function to be reliably detected.

The invention is applicable to an electronic control apparatus having a control circuit which performs processing for controlling a control object, and a controlled power supply circuit that receives an externally supplied power supply on/off changeover command, and supplies a power supply voltage to operate the control circuit when that command is in a power-on command status, with the controlled power supply means having a power supply holding function whereby the controlled power supply responds to changeover from the power-off command status to the power-on command status by supplying the power supply voltage to the control circuit, and responds to changeover from the power-on command status to the power-off command status of the power supply on/off changeover command by terminating the supplying of power to the control circuit after a predetermined delay interval has elapsed following the start of the power-off command status. That delay interval is referred to in the following as the power supply holding interval. In normal operation, the power supply holding interval is of sufficient duration to allow completion of specific processing by the control circuit, i.e., processing which is to be executed immediately prior to shut-down of the control circuit.

In order to overcome the above-described problem, according to a first aspect the present invention provides an electronic control apparatus having such a power supply holding function, characterized in comprising:

(a) measurement means for measuring the duration of the power supply holding interval, i.e., the actual interval that extends from beginning the power-off command status until termination of supplying the power supply voltage to the control circuit, and (b) abnormality detection means for detecting an abnormality of the power supply holding function based upon the measured duration obtained by the measurement means.

In that way, it becomes possible to detect an abnormality in the operation of the power supply holding function, irrespective of whether:

(1) a power supply holding failure abnormality occurs, resulting in a failure to maintain the power supply voltage of the control circuit for a sufficiently long duration to enable the specific processing to be completed, after the start of the power-off command status, or (2) a power supply interruption failure abnormality occurs, resulting in a failure to interrupt the supplying of the power supply voltage to the control circuit after the start of the power-off command status.

In addition, the invention enables the above two types of abnormality of the power supply holding function to be respectively distinguished, so that appropriate countermeasures can be applied in accordance with the type of abnormality.

To achieve this, for example to detect a power supply holding failure abnormality, the abnormality detection means compares the measured duration of the power supply holding interval with a predetermined power supply holding failure threshold value, and judges that a power supply holding failure abnormality is occurring when the measured duration value is found to be smaller than the power supply holding failure abnormality detection threshold value.

The power supply holding failure threshold value is preferably set as corresponding to a duration which is shorter than the minimum amount of delay that could occur (during normal operation) between a point at which the power supply on/off switching command goes to the switch-off command status and the subsequent point at which the supplying of the power supply voltage to the control circuit becomes actually halted. That minimum amount of delay is the sum of:

(a) the logical minimum duration of the specific processing, and (b) the delay that would occur between entering the power supply switch-off command status and the point of terminating operation of the control circuit, if the power supply holding function were not incorporated. Specifically, that is the delay from the point of completion of the specific processing (the point when an operation for actual shut-off of power to the control circuit is initiated) to the subsequent point of actual cessation of operation of the control circuit, i.e., a delay caused by functioning of hardware such as a relay, etc. The latter delay will be referred to in the following as the "hardware" delay for convenience of description.

In that way, erroneous judgement of occurrence of a power supply holding failure abnormality, during normal operation, can be avoided.

Similarly, to detect a power supply interruption failure abnormality, the abnormality detection means compares the measured duration of the power supply holding interval with a predetermined power supply interruption failure threshold value, and judges that a power supply holding failure abnormality is occurring when the measured duration value is found to be greater than the power supply interruption failure abnormality detection threshold value.

The power supply interruption failure threshold value is preferably set as corresponding to a duration which is longer than the maximum amount of delay that could occur (during normal operation) between a point at which the power supply on/off switching command goes to the switch-off command status and the subsequent point at which the supplying of the power supply voltage to the control circuit is actually terminated. That maximum amount of delay is the sum of:

(a) the logical maximum duration of the specific processing, and (b) the delay that would occur between entering the power supply switch-off command status and the point of terminating operation of the control circuit, if the power supply holding function were not incorporated, i.e., the aforementioned hardware delay.

Furthermore the apparatus is preferably configured to perform fail-safe processing whereby the aforementioned specific processing is executed by the control circuit at each changeover from the power-off command status to the power-on command status, after the abnormality detection means has detected that a power supply holding failure abnormality is occurring. In that way, although in that condition the control circuit cannot perform the specific processing in the normal manner each time the power supply on/off changeover command goes to the power-on command status, the specific processing will be reliably executed each time that the supplying of power to the control circuit is restarted and the operation of the control circuit thereby restarts.

In addition, the apparatus is preferably configured such that (as an additional component of the fail-safe processing), when the abnormality detection means has detected that the power supply interruption failure abnormality is occurring, the control circuit performs the specific processing at each changeover from the power-off command status to the power-on command status, instead of each changeover from the power-on command status to the power-off command status.

This has the advantage that the amount of vehicle battery power that is consumed can be minimized, since it is ensured that there is no possibility of the specific processing (and any associated control operations) being repetitively executed during each interval in which the vehicle is not being driven but the control circuit remains operational.

Furthermore, in the case of a system in which the control circuit performs driving of a predetermined actuator after a fixed time interval has elapsed following changeover to the power-off command status, the control circuit is preferably configured to inhibit the driving of the actuator when the abnormality detection means detects that the power supply interruption failure abnormality is occurring. This further serves to minimize the level of battery power that will be consumed in the event of occurrence of the power supply interruption failure abnormality.

By taking such measures, it becomes possible to reduce the possibility of the vehicle battery becoming completely discharged (during an interval in which the vehicle is not being utilized) as a result of occurrence of the power supply interruption failure abnormality.

From another aspect, the measurement means can comprise a non-volatile memory which successively stores respective updated measured values of the power supply holding interval, and the abnormality detection means detects an abnormality of the power supply holding function based upon the power supply holding interval value that is currently held in the non-volatile memory.

Specifically, each time there is a changeover to the power-off command status, the duration of the power supply holding interval which thereafter elapses is measured, and the measured value stored in the non-volatile memory. Each time there is a changeover to the power-on command status, the most recently stored duration of the power supply holding interval is read out, and used as a basis for abnormality detection.

Alternatively, the measured value of power supply holding interval can be stored in a backup RAM.

Typically, the power supply on/off changeover command function will be implemented by an ignition switch signal of a vehicle, i.e., which goes to an on or an off level in accordance with the ignition switch being set to the on or off position.

Alternatively, the power supply on/off changeover command function may be implemented as a key switch signal, which goes to an on or an off level in accordance with the ignition key being inserted in or removed from the ignition key cylinder.

In addition, the power supply on/off changeover command status is not necessarily determined by the state of a single signal, but may be determined by a combination of conditions of a plurality of signals. For example, it may be arranged that when at least one of the plurality of signals is at an active level, this constitutes the power-on command status, while when all of the signals are at the inactive level, this constitutes the power-off command status.

BRIEF DESCRIPTION OF THE DRAWINGS

FIGS. 5A, 5B and 5C are timing diagrams for use in describing the operation of the embodiment.

DESCRIPTION OF PREFERRED EMBODIMENTS

Figure 1:
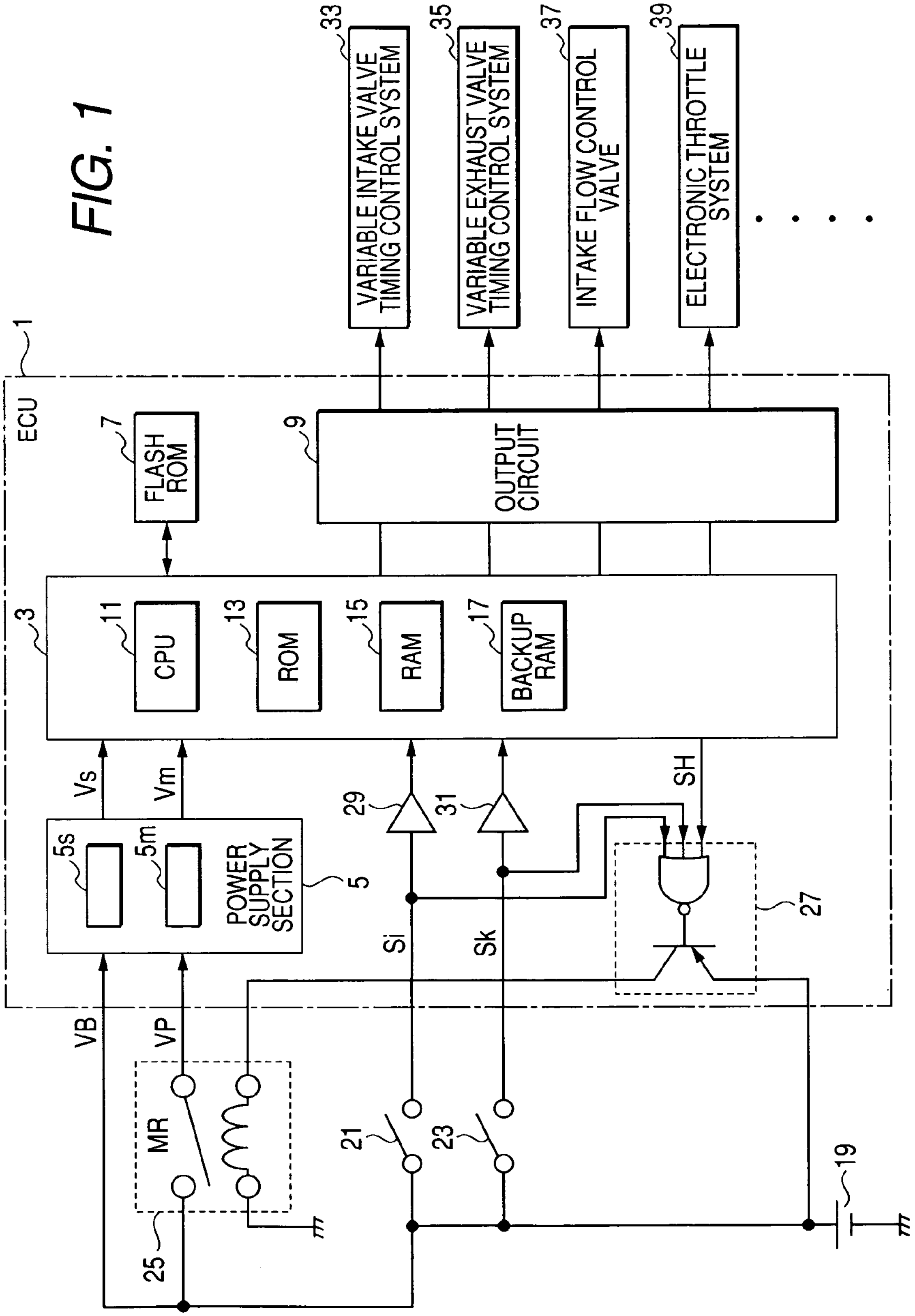
FIG. 1 shows the general configuration of an embodiment of an ECU.

An embodiment of a vehicle ECU (electronic control unit) will be described in the following. It will be assumed that this is an engine control ECU. Referring to FIG. 1, the ECU 1 is made up of a microcomputer 3 which performs various processing relating to engine control, and a power supply section 5 having a main power supply circuit 5*m* that produces a first power supply voltage (referred to in the following as the main power supply voltage Vm) for operating the microcomputer 3 and an auxiliary power supply circuit 5*s* which produces a second power supply voltage (referred to in the following as the auxiliary power supply voltage Vs) for supplying power to circuits (other than the microcomputer 3) that function during operation of the ECU 1. The ECU 1 further includes a flash ROM 13 (i.e., a rewriteable type of non-volatile memory), and an output circuit 9 that produces control signals in accordance with input signals supplied from the microcomputer 3, with the control signals being applied to various equipment relating to engine control.

The microcomputer 3 has a usual type of configuration, being formed of a CPU 11, a ROM 13, RAM 15, etc., but in addition the microcomputer 3 includes a backup RAM 17, i.e., which has a backup power supply, but is supplied with the auxiliary power supply voltage Vs during normal operation.

The auxiliary power supply circuit 5*s* of the power supply section 5 operates from the output voltage from the positive terminal of the vehicle battery 19 (referred to in the following as the battery voltage VB), to produce the auxiliary power supply voltage Vs.

The main power supply circuit 5*m* of the power supply section 5 operates from the battery voltage VB, supplied from the battery 19 via a main relay 25, which is disposed external to the ECU 1. When the ignition switch 21 of the vehicle is switched on (i.e., by the ignition key being inserted and set to the on position), or when a key switch 23 of the ignition is switched on (i.e., by the ignition key being inserted in the key cylinder), or a power supply holding signal SH produced from the microcomputer 3 goes to a high level, so that at least one of the three inputs of a main relay drive circuit 27 within the ECU 1 goes to the high level, the main relay drive circuit 27 drives the coil of the main relay 25 to close the relay contacts, so that the battery voltage VB is supplied (as voltage VP in FIG. 1) to the main power supply circuit 5*m*. In that condition, the main power supply circuit 5*m* produces the main power supply voltage Vm from the supplied voltage VP.

The operation is as follows. When the ignition key is inserted in the key cylinder, the contacts of the key switch 23 are thereby closed, so that the key switch signal Sk is inputted to the ECU 1 at a high level. When the ignition key is then set to the on position, so that the contacts of the ignition switch 21 are closed, the key switch signal Sk is also inputted to the ECU 1 at the high level.

The logic circuit components of the main relay drive circuit 27 operate from the auxiliary power supply voltage Vs.

When the main power supply circuit 5*m* begins to produce the main power supply voltage Vm, the power supply section 5 outputs a reset signal to the microcomputer 3 during a specific short duration which is sufficient to allow the main power supply voltage Vm to stabilize, i.e., the microcomputer 3 has a power-on reset function. As a result, the microcomputer 3 begins to operate correctly from an initial status when the supplying of the main power supply voltage Vm begins.

The microcomputer 3 also receives as inputs the ignition switch signal Si and the key switch signal Sk, transferred via respective buffer circuits 29 and 31. Although not shown in the drawings, the microcomputer 3 also receives various other types of signal for use in monitoring the running condition of the vehicle. Such signals include an engine coolant temperature sensor, a speed sensor signal (indicating the speed at which the vehicle is running), etc.

Equipment that are controlled by output signals from the microcomputer 3 (transferred via a output circuit 9, as shown) with this embodiment include an actuator 33 of a variable intake valve timing control system (which controls the opening and closing timings of the engine intake valves), an actuator 35 of a variable exhaust valve timing control system (which controls the opening and closing timings of the engine exhaust valves), an intake flow control valve 37 (which controls the engine air intake flow rate), and an actuator 39 of an electronic throttle control system, etc.

When either of the ignition switch 21 or key switch 23 is actuated by the vehicle user, so that the ignition switch signal Si or key switch signal Sk goes to the high level, the main relay 25 is thereby set on so that the battery voltage is supplies as voltage VP to the power supply section 5, and the main power supply circuit 5*m* thereby supplies the main power supply voltage Vm to the microcomputer 3. The microcomputer 3 thereby begins operation. It can be considered that this activation of the microcomputer 3 constitutes activation of the ECU 1 itself, with the battery voltage VP transferred from the main relay 25 constituting the power supply voltage for the ECU 1.

When the ignition switch 21 and key switch 23 are subsequently both set in the off state, so that both the ignition switch signal Si and the key switch signal Sk go to the low level (i.e., ground potential, with this embodiment), the power supply holding signal SH begins to be supplied from the microcomputer 3 to the main relay drive circuit 27 at the high level. The main relay drive circuit 27 is thereby held in the on state, with the battery voltage VP continuing to be supplied to the power supply section 5, so that supplying of the main power supply voltage Vm to the microcomputer 3 is continued. This condition is maintained during an interval referred to herein as the power supply holding interval, during which the microcomputer 3 executes specific processing. When the microcomputer 3 completes the specific processing, it sets the power supply holding signal SH to the low level, so that the main relay drive circuit 27 opens the relay contacts of the main relay 25, and the supplying of the battery voltage VP to the power supply section 5 is halted. The operation of the microcomputer 3 is thereby halted, i.e., the operation of the ECU 1 is halted. This function, whereby the operation of the ECU 1 is continued during the power supply holding interval after both of the switches 21, 23 have been switched off, will be referred to as the power supply holding function.

The aforementioned specific processing that is executed by the microcomputer 3 during the power supply holding interval will be referred to as the power supply holding interval processing. This can for example consist of data backup processing, whereby learned values that relate to control of the engine or the automatic transmission of the vehicle are read out from the backup RAM 17 and written into the flash ROM 13. Alternatively or in addition, the power supply holding interval processing can include processing for improving the engine starting performance, by driving the actuators of the variable intake valve timing control system 33 and variable exhaust valve timing control system 35 to optimum conditions for the intake and exhaust valves, in preparation for the next time that the engine is started. As an example of such optimum conditions, the intake valve timing may be set for maximum angle of delay, and the exhaust valve timing may be set for maximum angle of advancement.

Figure 2:
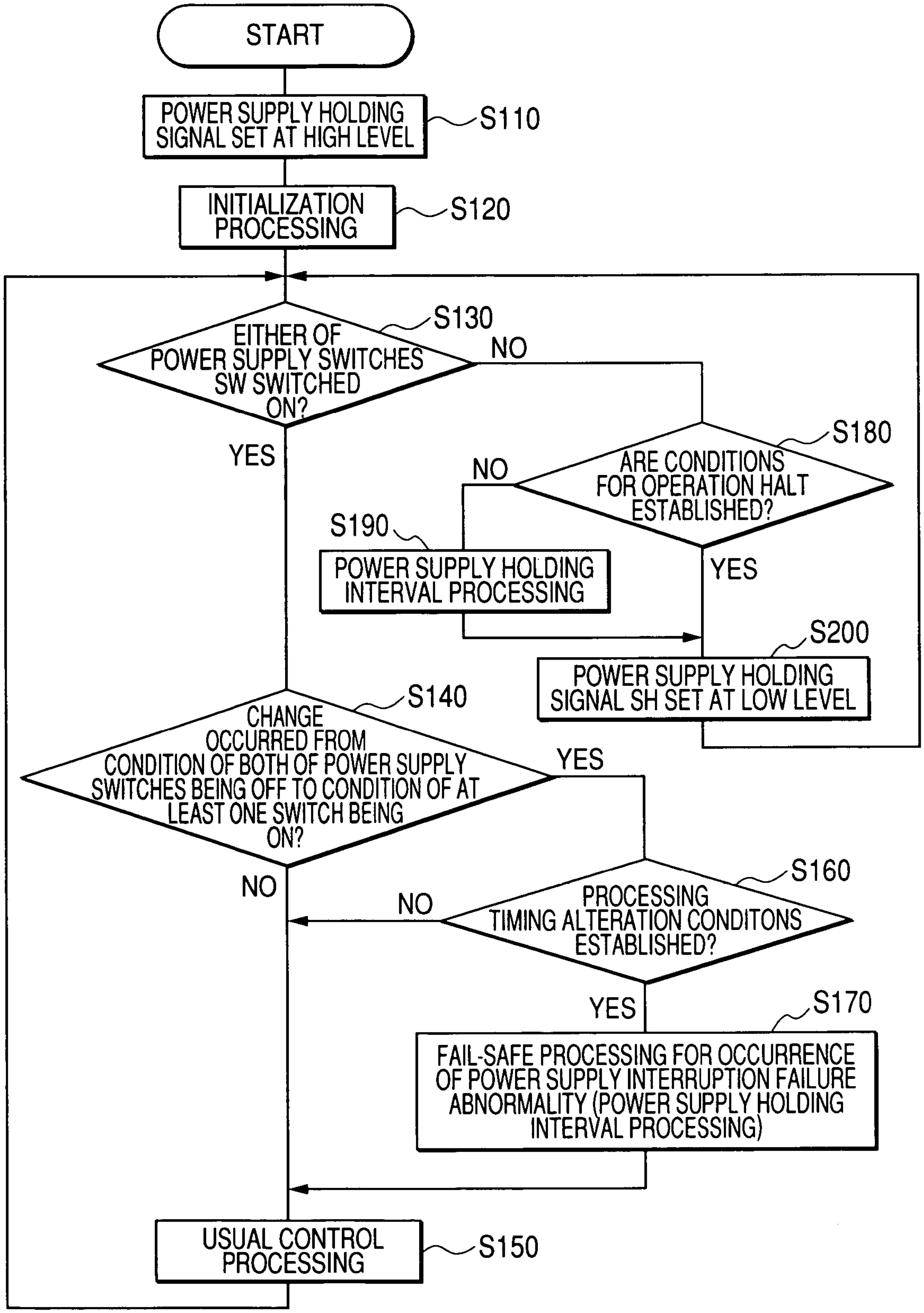
FIG. 2 is a flow diagram illustrating the overall processing that is executed by a microcomputer in the embodiment.

The overall flow of processing executed by the microcomputer 3 will be described referring to the flow diagram of FIG. 2. In the following, the ignition switch 21 and the key switch 23 are collectively referred to as the power supply switches SW, for brevity of description. As shown in FIG. 2, when the microcomputer 3 begins to receive the main power supply voltage Vm from the main power supply circuit 5*m* and so begins operation, then firstly (step S110) the power supply holding signal SH is supplied to the main relay drive circuit 27 at the high level. As a result, irrespective of the on or off conditions of the switches SW, the battery voltage VP is supplied to the power supply section 5 from the main relay 25.

Next, in step S120, initialization processing is executed for initializing the RAM 15 and registers (not shown in the drawings) within the microcomputer 3. As a result of this initialization processing, switch information (i.e., on/off detection values) held in the RAM 15 indicating the on and off statuses of the power supply switches SW, is reset to indicate that both switches are in the off state.

Next, in step S130, a decision is made as to whether either of the power supply switches SW is in the on state. If one or both of the power supply switches SW is in the on state, then operation proceeds to step S140. The judgement as to the on/off statuses of the power supply switches SW is made based on the output signals from the buffer circuits 29 and 31.

In step S140 a decision is made as to whether this is the first time (since the operation of the ECU 1 was restarted) that a YES decision has been reached in step S130, i.e., the first time that it has been judged that at least one of the power supply switches SW is switched on. If there is a NO decision in step S140 then operation proceeds to step S150, in which the microcomputer 3 performs usual control processing to control one or more control objects. Operation then returns to step S140. The usual control processing can for example consist of control of the engine fuel injection system and ignition system, control of engine valve opening/closing timings in accordance with the running condition of the vehicle, control of the degree of throttle opening, etc.

If there is a YES decision in step S140 (i.e., this is the first time that either of the power supply switches SW has been found to be in the on state) then operation proceeds to step S160. In step S160 a decision is made as to whether predetermined processing timing alteration conditions (described hereinafter) are met. If these conditions are not met, then operation proceeds to step S150.

If it is found in step S160 that the processing timing alteration conditions are met, then step S170 is executed, in which fail-safe processing is performed for the case of power supply interruption failure abnormality occurrence. Essentially, this consists of executing the aforementioned power supply holding interval processing. (That processing is also executed in step S190, described hereinafter).

The judgement performed in step S160 is based on the condition of a processing timing alteration flag that is held in the flash ROM 13 or the backup RAM 17, and which is set (e.g., to a logic “1” state) when there a NO decision is reached in a step S180, described hereinafter referring to FIG. 4. Effectively, a YES decision is reached in step S160 if:

(a) the processing timing alteration flag has been set (indicating that the above-described power supply interruption failure abnormality is occurring), and (b) this is the first execution of step S160 since the operation of the microcomputer 3 was restarted, (i.e., since a change occurred from the condition of both of the power supply switches SW being switched off to a condition in which one of these switches has become switched on).

A YES decision in step S160 signifies that the timing of executing the aforementioned specific processing by the microcomputer 3 is to be changed from (1) a transition from the condition of at least one of the power supply switches SW being switched on to the condition of both of the power supply switches SW being switched off, to (2) a transition from the condition of both of the power supply switches SW being switched off to the condition of either of the power supply switches SW being switched on.

If there is a NO decision in step S130, indicating that both of the power supply switches SW are off, then operation proceeds to step S180. In step S180, a decision is made as to whether the operation halt conditions (i.e., for halting operation of the microcomputer 3) are satisfied. Specifically, it is found that these conditions are satisfied, and a YES decision reached in step S180 if:

(a) the aforementioned processing timing alteration flag is found to be set, or (b) the power supply holding interval processing has previously been executed in step S190 (i.e., as a result of a NO decision having been previously reached in step S130).

If a NO decision is reached in step S180 at this time, then the power supply holding interval processing (described hereinafter) is executed, in step S190.

If a YES decision is reached in step S180, i.e., the operation halt conditions are satisfied, then in step S200 the power supply holding signal SH is inputted to the main relay drive circuit 27 at the low level. Operation then returns to step S130.

If the power supply holding function is operating normally, then at the time point when the power supply holding signal SH is set to the low level in step S200, the main relay 25 will be switched off (i.e., relay contacts open), so that the supplying of power from the main power supply circuit 5*m* to the microcomputer 3 will be halted. The operation of the microcomputer 3 and hence of the ECU 1 is thereby halted.

However if a power supply interruption failure abnormality of the power supply holding function is occurring, then even when the power supply holding signal SH is inputted to the main relay drive circuit 27 from the microcomputer 3 at the low level, the main power supply voltage Vm will continue to be supplied from the main power supply circuit 5*m* to the microcomputer 3. As a result, the microcomputer 3 will repetitively execute the processing loop:

[S200:NO→S180:YES S200]

Figure 3:
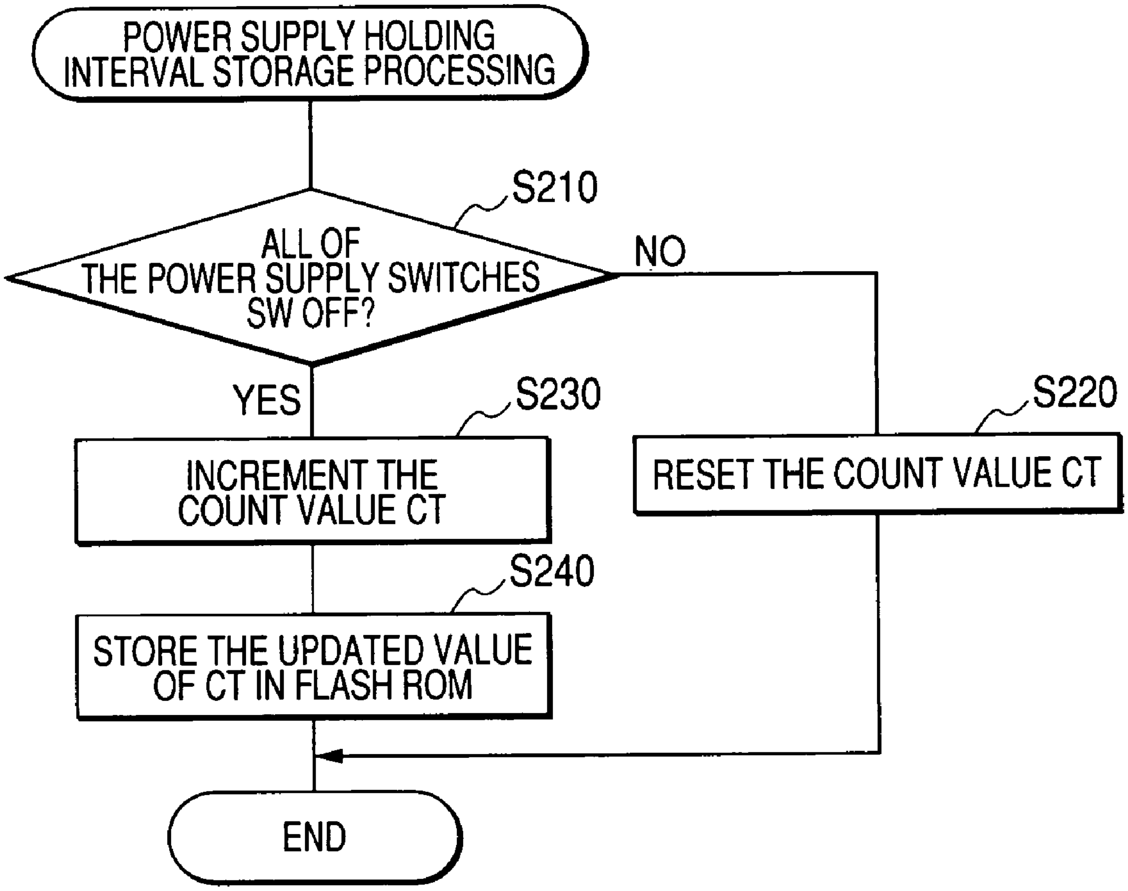
FIG. 3 is a flow diagram of a power supply holding interval processing routine that is executed by the microcomputer of the embodiment.

FIG. 3 is a flow diagram of power supply holding interval storage processing routine that is executed by the microcomputer 3 periodically (e.g., at intervals of 65 ms) to measure and store the value of the power supply holding interval. That interval is the time that elapses from a point when it is detected that both of the power supply switches SW are in the off state until a subsequent point at which the supplying of the main power supply voltage Vm is interrupted (or more specifically, a subsequent point at which the main power supply voltage Vm falls below a level at which the microcomputer 3 can operate). The measured value of the power supply holding interval is stored in the flash ROM 13.

As shown in FIG. 3, when execution of this routine begins, then first in step S210 a decision is made as to whether both of the power supply switches SW are in the off state. If either of the power supply switches SW is on, then a count value CT that is held in the RAM 15 is reset to zero, and this execution of the routine is ended.

However if it is found in step S210 that both of the power supply switches SW are off, then operation proceeds to step S230 in which the count value CT is incremented by a fixed amount. Next in step S240 the incremented count value CT is stored in the RAM 15, and this execution of the routine is ended.

It can thus be understood that with this processing, the duration for which the main power supply voltage Vm continues to be supplied to the microcomputer 3 after both of the power supply switches SW have entered the switched-off condition is measured as a count value CT that is incremented at regular intervals and stored in the RAM 15. When the supplying of the main power supply voltage Vm to the microcomputer 3 is halted, so that the operation of the microcomputer 3 is accordingly halted, the incrementing of the count value CT is terminated. After being subsequently utilized when the microcomputer 3 is restarted, as described hereinafter, CT is reset to zero.

A malfunction judgement processing routine will be described referring to the flow diagram of FIG. 4. This processing is executed by the microcomputer 3 for the purpose of detecting any abnormality of the power supply holding function and, if any, the type of abnormality. This routine is executed periodically (e.g., at intervals of 65 ms).

Figure 4:
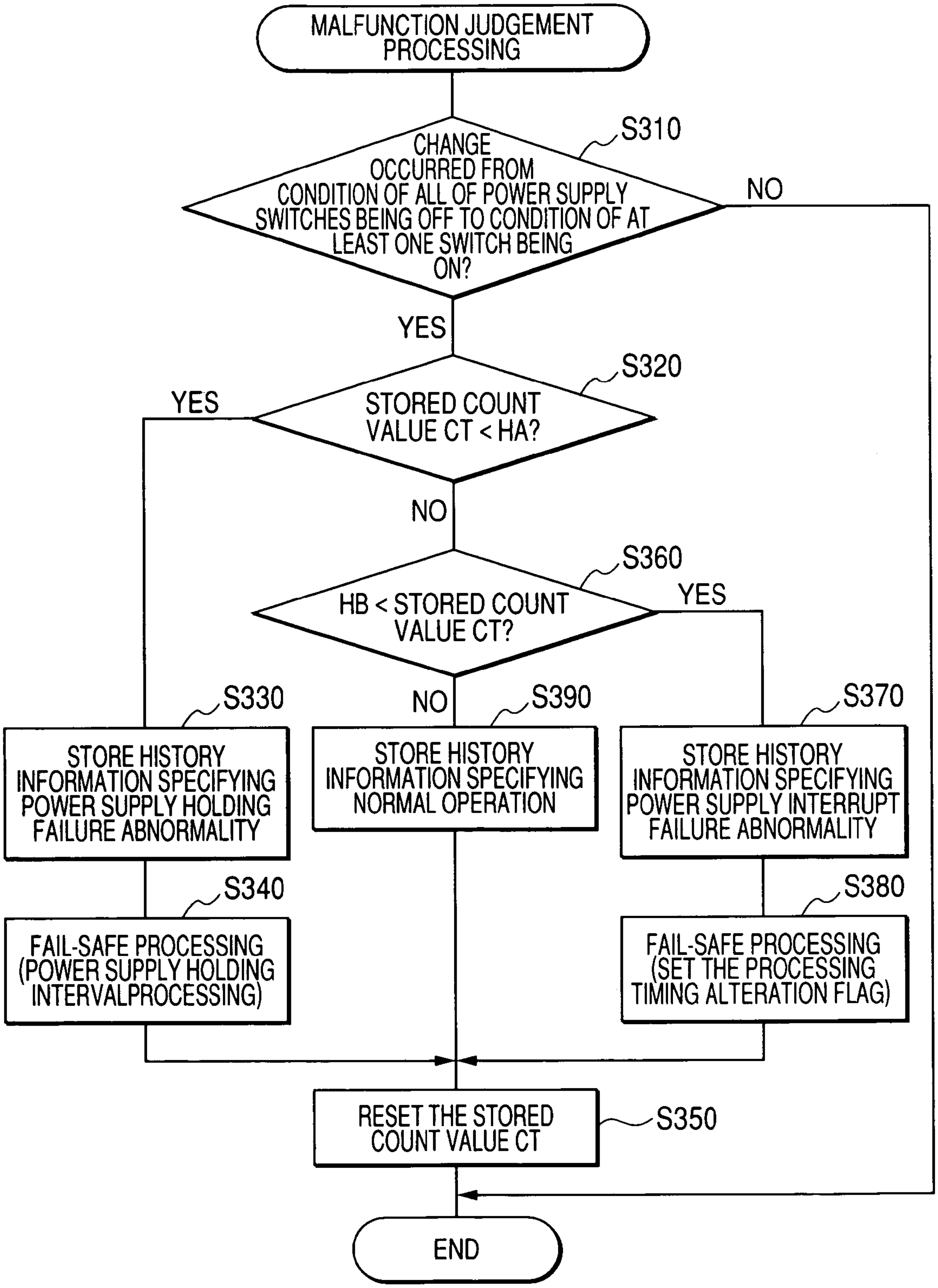
FIG. 4 is a flow diagram of an abnormality judgement processing routine that is executed by the microcomputer of the embodiment.

As shown in FIG. 4, when execution of this routine begins, a decision is made (step S310) as to whether a change has occurred from the condition in which both of the power supply switches SW are switched off to a condition in which either of these switches is switched on. If both of the power supply switches SW are found to be off, then this execution of the routine is ended. However if either switch is on, then operation proceeds to step S320.

In step S320, the aforementioned count value CT is read out from the flash ROM 13 (i.e., the most recently updated version of CT, that is currently held in the flash ROM 13), and a decision is made as to whether CT is lower than a predetermined value referred as the No. 1 threshold value HA. This constitutes a threshold value for judging whether a power supply holding failure abnormality is occurring.

With this embodiment, occurrence of a power supply holding failure abnormality signifies that, after it is detected that both of the power supply switches SW have become switched off, the processing of step S190 is not continued until the power supply holding interval processing has been completely executed.

The No. 1 threshold value HA is made smaller than a count value of CT corresponding to a delay that will normally occur (i.e., when the power supply holding function is operating normally) between a point at which it is detected that both of the power supply switches SW have become switched off, so that the power-off command status is entered, and a subsequent point at which the operation the microcomputer 3 becomes actually halted. Specifically, HA is made smaller than a count value corresponding to the total of:

(1) the logical minimum duration that is required to complete the execution of the specific processing, and (2) the delay that occurs from the point of completion of the specific processing (i.e., the point when cessation of supplying power to the control circuit is initiated, by setting the signal SH to the low level) to the subsequent point of actual cessation of operation of the control circuit, i.e., the hardware delay due to functioning of the main relay 25, etc.

If it is found in step S320 that the count value CT read out from the flash ROM 13 is smaller than HA, then it is judged that a power supply holding failure abnormality is occurring, so that operation proceeds to step S330. In step S330, information specifying this malfunction is stored in the flash ROM 13 or in the backup RAM 17, as part of an operation history. Processing is then executed to notify the vehicle user of the malfunction occurrence. This processing can for example cause a warning lamp to flash, or cause a warning message to appear on a display.

Next in step S340, the same power supply holding interval processing is executed as for step S190 of FIG. 2 described above, as fail-safe processing in response to detection of the power supply holding failure abnormality. In that way, even if the power supply holding interval processing was not executed to completion at that last occasion before the operation of the microcomputer 3 was halted, that processing is reliably executed when the microcomputer 3 is restarted.

Step S350 is then executed, in which the count value CT held in the flash ROM 13 is reset to zero.

However if it is found in step S320 that the count value CT is not smaller than the No. 1 threshold value HA, then operation proceeds to step S360, in which a decision is made as to whether CT is greater than a No. 2 threshold value HB that is used to detect occurrence of a power supply interruption failure abnormality.

The No. 2 threshold value HB is predetermined to be larger than a count value corresponding to the maximum duration of the power supply holding interval that would occur in the case of normal operation of the power supply holding function. Specifically, HB is made is made larger than a count value corresponding to the total of:

(1) the logical maximum duration that is required to complete the execution of the specific processing, and (2) the delay that occurs from the point of completion of the specific processing to the subsequent point of actual cessation of operation of the control circuit, i.e., the hardware delay due to the operation of the main relay 25, etc.

If it is found in step S360 that the count value CT is greater than the No. 2 threshold value HB, then it is judged that a power supply interruption failure abnormality is occurring, and operation proceeds to step S370. In step S370, information specifying this malfunction is stored in the flash ROM 13 or the backup RAM 17, as part of the operation history. Processing is then executed to notify the vehicle user of the malfunction occurrence. This processing can for example cause a warning lamp to flash, or cause a warning message to appear on a display.

Next, in step S380 fail-safe processing is executed in response to the power supply interruption failure abnormality occurrence. Specifically, the aforementioned processing timing alteration flag that is held in the flash ROM 13 or the backup RAM 17 is set.

As a result of that flag being set, and that "set" status being detected in step S180 of FIG. 2 described above, the power supply holding interval processing of step S190 is not executed after it has been judged (step S130: NO) that both of the power supply switches SW are off. Instead, as a result of the "set" status of the processing timing alteration flag being detected in step S160 of FIG. 2, the power supply holding interval processing is executed in step S170.

After step S380 of FIG. 4, operation proceeds to step S350, in which the count value CT held in the flash ROM 13 is reset to zero, and execution of this routine is then ended.

However if it is found in step S360 that the count value CT is not greater than the No. 2 threshold value HB (i.e., HA≦CT≦HB) then it is judged that the power supply holding function is normal, and operation proceeds to step S390. In step S390, information specifying that the power supply holding function is operating normally is stored in the flash ROM 13 or the backup RAM 17, as part of the operation history.

Step S350 is then performed to reset CT, and this execution of the routine is then ended.

The information stored in the flash ROM 13 or backup RAM 17 as an operation history, in steps S330, S370 or S390 as described above, can for example be read out and supplied to a failure diagnosis apparatus that is coupled to the ECU 1.

The operation of the ECU 1 as described above referring to FIGS. 2 to 4 can be summarized as follows. Firstly, the case of normal operation of the power supply holding function will be discussed. In this condition, when a change occurs from the condition of both of the power supply switches SW being switched off to a condition in which one of these switches becomes switched on, i.e., a power-on command status is entered, so that the main power supply voltage Vm begins to be supplied to the microcomputer 3 from the main power supply circuit 5*m* and the microcomputer 3 thereby begins to operate, then after the processing of steps S110, S120 of FIG. 2, a YES decision will be reached in each of the steps S130 and S140. Step S160 is then executed. In this case, since the operation is normal, the processing timing alteration flag is not in the set condition, so that it will be judged in step S160 that the conditions for altering the timing of executing the power supply holding interval processing are not met. Hence, operation proceeds to step S150, so that normal control processing is then performed by the ECU 1.

Thereafter, so long as either of the power supply switches SW is in the on state, the processing sequence [S150→S130: YES→S140:NO→S150] will be repetitively executed.

Subsequently, when both of the power supply switches SW go to the off state, i.e., a power-off command status is entered, so that a NO decision is reached in step S130, operation proceeds to step S180. At that point, if the processing timing alteration flag has not been set, it will be judged that the conditions for altering the timing of executing the power supply holding interval processing are not met. Hence, operation proceeds to step S190, in which the power supply holding interval processing is executed.

On completion of step S190, operation proceeds to step S200 in which the power supply holding signal SH is inputted to the main relay drive circuit 27 at the low level. As a result, the main relay 25 is switched off, so that as shown in FIG. 5A, the supplying of the main power supply voltage Vm from the main power supply circuit 5*m* to the microcomputer 3 is then halted, and the operation of the microcomputer 3 (and hence, of the ECU 1) is thereby halted.

Thus, until the operation of the microcomputer 3 is halted, even if the sequence of processing steps [S200→S130: NO→S180] is returned to a few times (after the processing of step S190 has been completed and prior to the microcomputer 3 actually ceasing operation as a result of signal SH going to the low level), then since the power supply holding interval processing will already have been executed by that point, it will be judged in the second execution of step S180 (and in each of subsequent executions of that step) that the conditions for halting operation are satisfied. Thus, operation will proceed directly to step S200, omitting step S190.

That is to say, after the power supply holding interval processing has been completed, until the operation of the microcomputer 3 ceases, the sequence of processing steps [S200→S130:NO→S180:YES→S200] will be repetitively executed while both of the power supply switches SW remain off.

During the power supply holding interval, the count value CT held in the flash ROM 13 is successively incremented, by the power supply holding interval storage processing of FIG. 3, as illustrated in FIG. 5A. At the point when the supplying of the main power supply voltage Vm to the microcomputer 3 is halted, so that operation of the microcomputer 3 is halted, the incrementing of the count value CT thereby ceases, with the most recently updated value of CT being left stored in the flash ROM 13, representing the duration of the most recent power supply holding interval.

In normal operation, that stored value of CT will be between the No. 1 threshold value HA and the No. 2 threshold value HB, i.e., within a normal range.

Hence thereafter, when one of the power supply switches SW is switched on (i.e., a change from the condition of both switches being off) so that the operation of the microcomputer 3 is restarted, the sequence of steps [S310: YES→S320:NO→S360:NO→S390→S350] will be executed, in the malfunction detection processing routine of FIG. 4. That is to say, it will be judged that the power supply holding function is normal.

The case of power supply interruption failure abnormality of the power supply holding function will now be described. In that condition, once all of the power supply switches SW become switched off, then although the power supply holding signal SH is set at the low level by the microcomputer 3 (in step S200 of FIG. 2), the main power supply voltage Vm continues to be outputted from the main power supply circuit 5*m*.

Hence, as the microcomputer 3 continues to execute the processing of FIG. 2, the following processing loop will be repetitively performed: [S200→S130:NO→S180: YES→S200].

Furthermore, as a result of executing the power supply holding interval storage processing of FIG. 3, the count value CT held in the flash ROM 13 continues to be incremented. As a result, as shown in FIG. 5B, the value of CT will come to exceed the No. 2 threshold value HB.

Hence, when either of the power supply switches SW is subsequently switched on, the microcomputer 3 will execute processing (in the malfunction judgement processing of FIG. 4) in the sequence:

[S310:YES→S320:NO→S360: YES→S370→S380→S350]

That is to say, it will be judged that a power supply interruption failure abnormality of the power supply holding function is occurring (i.e., YES decision in step S360). Information specifying this malfunction is stored, as part of the operation history, and processing performed to produce a warning of the malfunction occurrence (step S370). The processing timing alteration flag is then set (step S380).

Moreover when one of the power supply switches SW becomes switched on (i.e., a change from the condition of both switches being off), the microcomputer 3 will make a YES decision in each of steps S130, S140 of FIG. 2, and operation will then proceed to step S160. At that point, since the processing timing alteration conditions are not yet established (i.e., the processing timing alteration flag has not yet been set, through execution of the malfunction judgement processing of FIG. 4), it will not be judged that a NO decision has been previously made in one or more executions of step S130 of FIG. 2. Thus, there will be a NO decision made in that execution of step S160, so that step S150 will then be executed.

Thereafter, while either of the power supply switches SW is switched on, the processing sequence [S150→S130: YES→S140:NO→S150] will be repetitively executed.

When both of the power supply switches SW thereafter become switched off, a NO decision will be reached in step S130, so that operation proceeds to step S180. However at that point in time, the processing timing alteration flag is already set, so that it will be judged in step S180 that the conditions for halting operation of the microcomputer 3 at that time are satisfied. Thus, operation proceeds to step S200 instead of the power supply holding interval processing of step S190.

Hence in that case, as a result of the power supply interruption failure abnormality occurring, the microcomputer 3 will continue to operate while repetitively executing the processing loop: [S200→S130:NO→S180: YES→S200]. In that way, it is ensured that there is no danger of the power supply holding interval processing being repetitively performed after the vehicle ignition key has been removed so that the engine is halted.

Thereafter, when one of the power supply switches SW becomes switched on, the microcomputer 3 will reach a YES decision in each of steps S130, S140 of FIG. 2, and will then execute step S160. At that time, the processing timing alteration conditions are satisfied (i.e., a NO decision has been reached in one or more executions of step S130 of FIG. 2, subsequent to the processing timing alteration flag having been set by means of the malfunction judgement processing of FIG. 4). Thus, a YES decision will be made in this execution of step S160 and in succeeding execution of this step. Operation then proceeds to step S170, in which the power supply holding interval processing is executed (i.e., the same processing as that of step S190, for the case of normal operation).

Operation then proceeds to step S150, in which the usual control processing is performed by the microcomputer 3.

Thus with the malfunction judgement processing of FIG. 4, when it is judged that a power supply interruption failure abnormality has occurred, then if the processing timing alteration flag is already set, the power supply holding interval processing which would normally be executed in step S190 (as a result of the condition "both power supply switches SW are off" having been detected), will actually be executed in step S170 (when it is detected that one of the power supply switches SW is switched on).

The operation for the case in which a power supply holding failure abnormality occurs will be summarized in the following. In this case, as illustrated in FIG. 5C, when a change occurs from the condition in which at least one of the power supply switches SW is switched on to the condition in which both of these are switched off, then although the microcomputer 3 sets the power supply holding signal SH to the high level, the main relay 25 fails to remain switched on, i.e., the relay contacts become opened when both the power supply switches SW become switched off. The supplying of the main power supply voltage Vm to the microcomputer 3 is thereby interrupted at that point, so that the operation of the microcomputer 3 is terminated before it can correctly execute the power supply holding interval processing of step S190.

That is to say, the time which elapses from the start of the condition in which both of the power supply switches SW are switched off until the supplying of power to the microcomputer 3 is halted is of insufficient duration. As a result, the power supply holding interval processing may not be executed to completion before the operation of the ECU 1 is halted, so that the (final) count value CT does not attain the No. 1 threshold value HA, as shown in FIG. 5C.

When one of the power supply switches SW is subsequently switched on, so that the operation of the microcomputer 3 is restarted, then the following sequence of steps will be executed with the malfunction judgement processing of FIG. 4:

[S310:YES→S320:YES→S330→S340→S350]

That is to say, it will be judged that a power supply holding failure abnormality of the power supply holding function is occurring (i.e., YES in step S320). Information specifying this malfunction is then stored, as part of the operation history, and processing is performed to produce a warning of the malfunction occurrence (step S330). Next, the power supply holding interval processing is executed in step S340 (i.e., the same processing as is performed when it is detected that both of the power supply switches SW have become switched off, during normal operation). Thus, when a power supply holding failure abnormality is detected, the power supply holding interval processing is executed when the main power supply voltage Vm begins to be supplied to the microcomputer 3, i.e., after either of the power supply switches SW becomes switched on.

It can thus be understood that with this embodiment, the ECU 1 measures the power supply holding interval duration, and detects abnormal operation of the power supply holding function based upon the measured values (i.e., the stored count value CT). It thereby becomes possible to detect both a power supply holding failure abnormality and a power supply interruption failure abnormality, and to reliably distinguish between these two different types of abnormality of the power supply holding function.

Moreover, appropriate fail-safe processing can be performed in accordance with the specific type of abnormality that is detected.

As described above, the fail-safe processing that is executed by the ECU 1 of this embodiment, in the event of power supply holding failure abnormality being detected, consists of performing the power supply holding interval processing (in step S340 of FIG. 4) each time that the main power supply voltage Vm begins to be supplied to the microcomputer 3, i.e., after either of the power supply switches SW becomes switched on (as detected in step S310).

As a result, the power supply holding interval processing can be reliably performed even if a power supply holding failure abnormality occurs. With this embodiment, the power supply holding interval processing consists of data backup processing whereby learned values that have been stored in the backup RAM 17 are read out and written into the flash ROM 13, and processing for improving the engine starting performance, and it can be understood that the embodiment enables this power supply holding interval processing to be reliably performed even when a power supply holding failure abnormality occurs. Loss of the learned values can thereby be prevented, and the engine starting performance can be improved.

Furthermore with this embodiment, the ECU 1 performs fail-safe processing in the event of detecting a power supply interruption failure abnormality of the power supply holding function. In this case, the power supply holding interval processing is executed (in step S170 of FIG. 2) when the main power supply voltage Vm begins to be supplied to the microcomputer 3, i.e., when either of the power supply switches SW has become becomes switched on, instead of executing the power supply holding interval processing when both of the power supply switches SW become switched off.

As a result, when power supply interruption failure abnormality occurs, it becomes possible to reduce the amount of power from the vehicle battery that is unnecessarily consumed while both of the power supply switches SW are in the off condition, since it can be ensured that the power supply holding interval processing will not be executed during that condition. The possibility of the vehicle battery becoming completely discharged can thereby be reduced.

In addition, it can be reliably ensured that the power supply holding interval processing will be reliably executed, each time that the operation of the ECU 1 begins.

Respective means that are set out in the appended claims are related to the above embodiment as follows. The main relay 25, the main relay drive circuit 27 and the main power supply circuit 5*m* of the power supply section 5, in combination, corresponds to the power supply control means. The logical sum of the respective states of the ignition switch signal Si and the key switch signal Sk corresponds to the power supply on/off changeover command. Hence, the condition of at least one of these signals being at the high level corresponds to the power-on command status. A change of the power supply holding signal SH (produced from the microcomputer 3) from the high level to the low level corresponds to the power supply halt command produced from the control circuit. The condition of both of the ignition switch signal Si and the key switch signal Sk being at the low level corresponds to the power-off command status. The processing routine shown in FIG. 3 corresponds to the measurement means. The processing constituted by the sequence of steps S320, S330, S360, S370 and S390 of FIG. 4 corresponds to the abnormality detection means.

It should be noted that the scope of the invention is not limited to the above embodiment, and that various modifications or alternative configurations could be envisaged.

In particular, respectively different types of fail-safe processing could be applied, in accordance with the type of abnormality of the power supply holding function that is detected. For example, the ECU 1 could have an actuator control function whereby a specific actuator is driven after a fixed time interval has elapsed following the point at which both of the power supply switches SW have become switched off. In that case, the system could be configured to execute fail-safe processing for that actuator control function, in the event that a power supply interruption failure abnormality of the power supply holding function is detected. As an example of such fail-safe processing (which could be performed as step S380 of FIG. 4), the driving of the actuator could be inhibited if the power supply interruption failure abnormality is detected.

In that way, unnecessary discharging of the vehicle battery in the event of a power supply interruption failure abnormality can be reduced, so that the possibility of the battery becoming completely discharged (during an interval in which the vehicle engine is halted) can be reduced.

Such an actuator can for example be used in failure diagnosis of a fuel tank vapor collection system of a vehicle (e.g., as described in Japanese patent publication No. 2003-139874). With such a failure diagnosis method, evaporated fuel vapor in the fuel tank is collected and is subjected to increases or lowering in pressure by means of an actuator, with resultant changes in vapor pressure being detected by a sensor, to thereby detect the vapor density within the collection system and so judge whether vapor leakage is occurring.

With the present invention, unnecessary execution of such a diagnosis operation can be prevented, thereby reducing unnecessary consumption of battery power while the vehicle engine is halted.

The following configurations would be equally possible for the power supply system of the ECU 1:

(1) A power supply circuit could be incorporated in the ECU 1 that would be supplied with the battery voltage VB via either the ignition switch 21 or the key switch 23 (i.e., controlled by the ignition switch signal Si or the key switch signal Sk), for producing the main power supply voltage Vm.

(2) It would be possible to input only the power supply holding signal SH to the main relay drive circuit 27.

(3) A main power supply voltage Vm produced from the power supply circuit of the alternative configuration (1) above, and also the main power supply voltage Vm that is produced from the main power supply circuit 5*m* based on the battery voltage VP from the main relay 25, could be supplied to the microcomputer 3 in a wired-OR configuration.

With any of the above alternative configurations (1) to (3), the same advantages would be obtained as described for the above embodiment.

Furthermore with the above embodiment, the power supply ON/OFF changeover command corresponds to the logical OR sum of the respective states of the ignition switch signal Si and the key switch signal Sk, i.e., if at least one of the ignition switch 21 and key switch 23 is on, so that the corresponding switch signal is at the active level this constitutes the "on" status of the power supply on/off changeover command, while when both of the ignition switch 21 and key switch 23 are off, this constitutes the "off" status of the power supply on/off changeover command. However it would be equally possible to use only a single switch signal to implement the power supply on/off changeover command, for example the signal from the ignition switch signal Si alone, or the signal from the key switch signal Sk alone.

Moreover it would be possible to store the power supply holding interval value in a backup RAM. A RAM has a higher speed of data write-in than a non-volatile memory, so that it would become possible to store more accurate values of the power supply holding interval.

What is claimed is:

1. An electronic control apparatus comprising a control circuit which performs processing for controlling a control object, and controlled power supply means responsive to a power-on command status of an externally supplied power supply on/off changeover command for supplying a power supply voltage to operate said control circuit, with said controlled power supply means comprising a power supply holding function whereby said controlled power supply means is responsive to initiation of said power-on command status for beginning to supply said power supply voltage to said control circuit, and is responsive to initiation of a power-off command status of said power supply on/off changeover command for terminating the supplying of said power supply voltage to said control circuit, until completion of the execution of specific processing by said control circuit;

wherein said electronic control apparatus comprises measurement means for measuring a duration of a power supply holding interval that extends from a point of changeover from said power-off command status to said power-on command status up to a point of cessation of supplying said power supply voltage to said control circuit, and abnormality detection means for detecting an abnormality of said power supply holding function based upon said measured duration obtained by said measurement means.

2. An electronic control apparatus according to claim 1, wherein said abnormality detection means distinguishes between:

a power supply holding failure abnormality whereby supplying of said power supply voltage to said control circuit does not continue until completion of said execution of said specific processing, following initiation of said power-off command status, and a power supply interruption failure abnormality whereby supplying of said power supply voltage to said control circuit is not terminated, following initiation of said power-off command status.

3. An electronic control apparatus according to claim 2, wherein said abnormality detection means compares said measured duration of the power supply holding interval with a predetermined power supply holding failure abnormality detection threshold value, and judges that a power supply holding failure abnormality is occurring when said measured duration is smaller than said power supply holding failure abnormality detection threshold value.

4. An electronic control apparatus according to claim 3, wherein said predetermined power supply holding failure abnormality detection threshold value is made smaller than the sum of:

a logical minimum amount of time required to complete the execution of said specific processing, and an amount of delay that would occur, in the absence of said power supply holding function, between initiation of said power-off command status and cessation of supplying said power supply voltage to said control circuit with resultant cessation of operation of said control circuit.

5. An electronic control apparatus according to claim 2, wherein said abnormality detection means compares said measured duration of the power supply holding interval with a predetermined power supply interruption failure abnormality detection threshold value, and judges that a power supply interruption failure abnormality is occurring when said measured duration is larger than said power supply interruption failure abnormality detection threshold value.

6. An electronic control apparatus according to claim 5, wherein said power supply interruption failure abnormality detection threshold value is set to a value that is greater than the sum of:

a logical maximum amount of time required to complete the execution of said specific processing, and an amount of delay that would occur, in the absence of said power supply holding function, between initiation of said power-off command status and cessation of supplying said power supply voltage to said control circuit with resultant cessation of operation of said control circuit.

7. An electronic control apparatus according to claim 2, wherein said control circuit comprises means for executing fail-safe processing when said abnormality detection means has detected that an abnormality of said power supply holding function is occurring, with said fail-safe processing being executed in accordance with a type of said detected abnormality.

8. An electronic control apparatus according to claim 7, wherein said specific processing is executed by said control circuit at each changeover from said power-off command status to said power-on command status, as said fail-safe processing, when said abnormality detection means has detected that said power supply holding failure abnormality is occurring.

9. An electronic control apparatus according to claim 7, wherein execution of said specific processing at each changeover from said power-on command status to said power-off command status is inhibited, and said specific processing is executed by said control circuit at each changeover from said power-off command status to said power-on command status, as said fail-safe processing, when said abnormality detection means has detected that said power supply interruption failure abnormality is occurring.

10. An electronic control apparatus according to claim 7 wherein during normal operation of said power supply holding function, said control circuit executes driving of a predetermined actuator after a fixed time interval has elapsed following initiation of said power-off command status, and as said fail-safe processing, said control circuit inhibits said driving of said actuator when said abnormality detection means detects that said power supply interruption failure abnormality is occurring.

11. An electronic control apparatus according to claim 1, wherein said measurement means comprises a non-volatile memory for successively storing respective updated measured values of said power supply holding interval, and said abnormality detection means detects an abnormality of said power supply holding function based upon a measured value of power supply holding interval that is currently held in said non-volatile memory.

12. An electronic control apparatus according to claim 1, wherein said measurement means comprises a backup RAM (random access memory) for successively storing respective updated measured value of said power supply holding interval, and said abnormality detection means detects an abnormality of said power supply holding function based upon a measured value of power supply holding interval value that is currently held in said backup RAM.

13. An electronic control apparatus according to claim 1, wherein said power-on command status and said power-off command status respectively correspond to an active status and an inactive status of an ignition switch signal, respectively resulting from switching on and switching off an ignition switch of a motor vehicle.

14. An electronic control apparatus according to claim 1, wherein said power-on command status and said power-off command status respectively correspond to an active status and an inactive status of a key switch signal, respectively resulting from insertion and non-insertion of an ignition key in an ignition key cylinder of a motor vehicle.

15. An electronic control apparatus according to claim 1, wherein said power-on command status corresponds to at least one of an active status of an ignition switch signal resulting from switch-on of an ignition switch of a motor vehicle and an active status of a key switch signal resulting from insertion of said ignition switch in an ignition key cylinder of said motor vehicle and said power-off command status corresponds to a combination of inactive statuses of both said ignition switch signal and said ignition key signal.

* * * * *